(12) United States Patent
Kawade et al.

(10) Patent No.: US 6,839,835 B2
(45) Date of Patent: Jan. 4, 2005

(54) METHOD OF LOADING INITIAL PROGRAM IN PROCESSOR SYSTEM

(75) Inventors: Takahisa Kawade, Yokohama (JP); Masayoshi Sekine, Tokyo (JP); Gaku Watanabe, Tokyo (JP); Keihiro Kurakata, Kodaira (JP)

(73) Assignee: Canon Kabushiki Kaisha, Tokyo (JP)

( * ) Notice: Subject to any disclaimer, the term of this patent is extended or adjusted under 35 U.S.C. 154(b) by 583 days.

(21) Appl. No.: 09/770,308

(22) Filed: Jan. 29, 2001

(65) Prior Publication Data

US 2001/0020269 A1 Sep. 6, 2001

(30) Foreign Application Priority Data

Feb. 2, 2000 (JP) ........................................ 2000-025140

(51) Int. Cl.⁷ ............................ G06F 9/445; G06F 9/24; G06F 3/00
(52) U.S. Cl. ................................. 713/2; 713/1; 710/10
(58) Field of Search .......................... 713/2, 1; 710/10; 709/221, 222

(56) References Cited

U.S. PATENT DOCUMENTS

| 5,349,643 A | * | 9/1994 | Cox et al. ................ 713/155 |
| 5,410,707 A | * | 4/1995 | Bell ............................ 713/2 |
| 5,546,585 A | * | 8/1996 | Soga .......................... 713/2 |
| 5,848,296 A | * | 12/1998 | Suzuki ...................... 710/10 |
| 5,933,595 A | * | 8/1999 | Iizuka et al. .............. 714/35 |

FOREIGN PATENT DOCUMENTS

JP          02238558 A   *   9/1990   ........... G06F/15/16

OTHER PUBLICATIONS

IBM, Initial Machine Load Process for Personal Computer Network System, Sep. 1, 1993, vol. 36, Issue 9B, pp. 541–542.*

* cited by examiner

Primary Examiner—Dennis M. Butler
Assistant Examiner—Suresh K Suryawanishi
(74) Attorney, Agent, or Firm—Fitzpatrick, Cella, Harper & Scinto (57) ABSTRACT

In a processor system having a CPU, a RAM, and a communication portion for external communication, the operation of the central processing unit is stopped when an IPL operation mode is selected by an operation mode selection switch. An IPL program transferred from the outside through the communication portion is then written to the RAM starting from a predetermined address, and the stoppage of the operation of the CPU is thereafter canceled. The CPU restarting the operation executes the IPL program written to the RAM by first reading the predetermined address to download a system program. Since the IPL program is transferred from the outside, the IPL program to be used can be easily changed.

20 Claims, 5 Drawing Sheets

METHOD OF LOADING INITIAL PROGRAM IN PROCESSOR SYSTEM

BACKGROUND OF THE INVENTION

1. Field of the Invention

The present invention relates to an initial program loading (IPL) operation in a processor system.

2. Related Background Art

Figure 4:
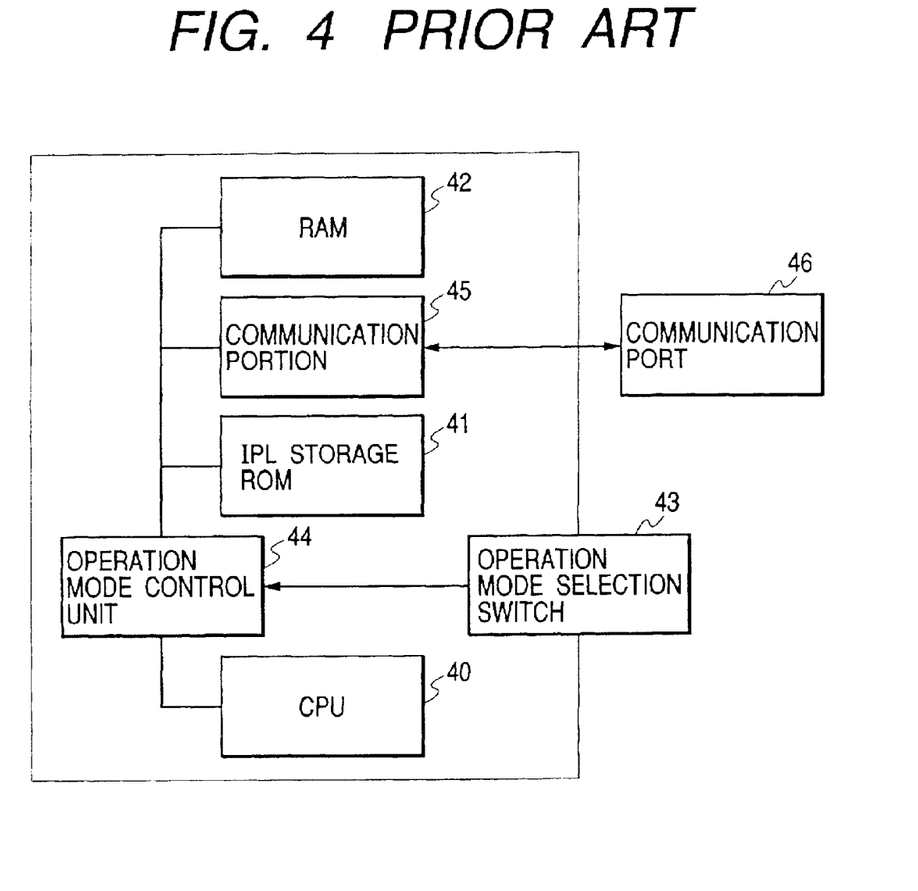
FIG. 4 is a block diagram showing the configuration of a conventional processor system which performs an IPL operation.
Figure 5:
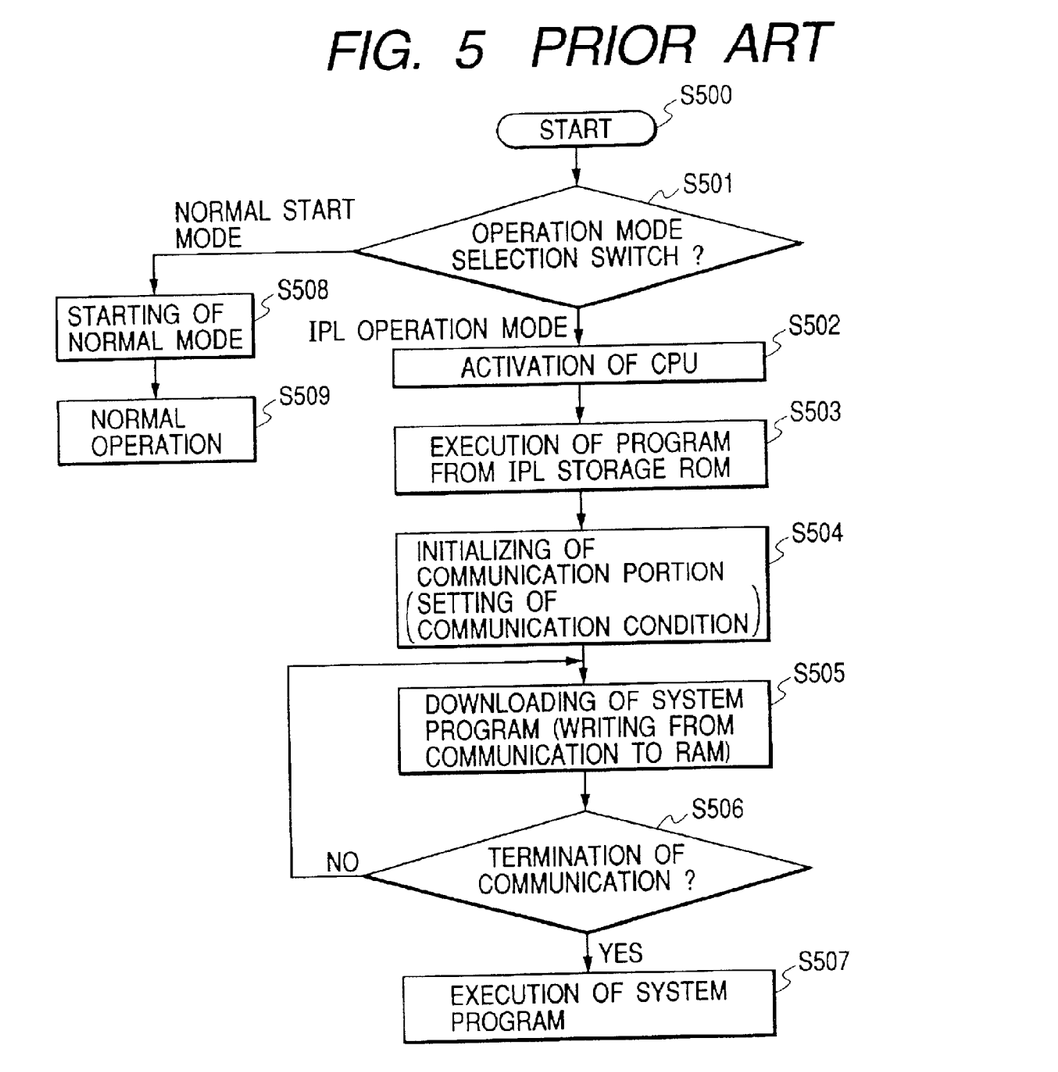
FIG. 5 is a flowchart of the basic operation in the IPL operation mode and in the normal start mode in the conventional system.

FIG. 4 is a block diagram showing the configuration of a conventional processor system in which IPL operation is performed. FIG. 5 is a flowchart of the basis operation of the conventional system in an IPL operation mode and in a normal start mode.

In the system shown in FIG. 4, the IPL operation mode is selected by an operation mode selection switch 43 (step S501), and a central processing unit (CPU) 40 starts operating (step S502). The CPU 40 then loads an initial program loader (hereinafter referred to simply as "initial program" or "IPL program") held in a read-only memory (ROM) 41 added as an IPL storage to the processor system, and starts the initial program (step S503).

The CPU 40 initializes a communication portion 45 (sets communication conditions) by the started initial program (step S504), and downloads a system program from the outside of the processor system through a communication port 46. Writing of the downloaded system program to a random access memory (RAM) 42 or the like connected to the system is continued until the communication is finished (steps S505, S506). When the communication is finished, the downloaded system program is started (step S507). On the other hand, when a normal start mode is selected by the operation mode selection switch 43, the CPU starts operating in the normal mode and performs the normal operation (steps S508, S509).

As described above, for conventional processor systems, a method is generally used in which an initial program is provided in advance by being written into the ROM 41 or the like added to the processor system, and the initial program is loaded from the ROM 41 or the like added to the processor system when the IPL operation mode is selected.

In the conventional system, however, it is difficult to rewrite the IPL program if the IPL program is provided by being written into a non-rewritable. To rewrite IPL program, it is necessary to change the ROM or to use an erasing and writing device specially provided for the ROM.

Further, having an IPL-storage ROM necessitates a special circuit for access the ROM, and different erasing and writing methods are required with respect to different ROM manufacturers or various types of IPL-storage ROM. To enable interchange or replacement of ROMs, therefore, it is necessary to select the circuit configuration and the control method suitable for ROMs to be used.

SUMMARY OF THE INVENTION

The present invention has been made in view of the above, an object of the present invention is to provide a system or method for enabling an IPL program to be easily changed.

According to one aspect, the present invention which achieves this objective relates to a processor system comprising a central processing unit, a writeable memory, means for external communication, operation mode selection means for selecting an operation mode, control means for stopping the operation of the central processing unit and writing to the memory an IPL program transferred from the outside through the communication means when an IPL operation mode is selected by the operation mode selection means, and for thereafter canceling the stoppage of the operation of the central processing unit, and IPL operation means for executing the IPL program written to the memory through the operation of the central processing unit to download a system program.

According to another aspect, the present invention which achieves the above objective relates to a method of starting a processor system having a central processing unit, a writeable memory, and a communication portion for external communication, the method comprising the steps of stopping the operation of the central processing unit when an IPL operation mode is selected, writing to the memory an IPL program transferred from the outside through the communication portion, canceling the stoppage of the operation of the central processing unit after the writing, and executing the IPL program written to the memory through the operation of the central processing unit to download a system program.

Other objectives and advantages besides those discussed above shall be apparent to those skilled in the art from the description of preferred embodiments of the invention which follow. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described in detail with reference to the accompanying drawings.

(First Embodiment)

A first embodiment of the present invention will be described with reference to the drawings.

Figure 1:
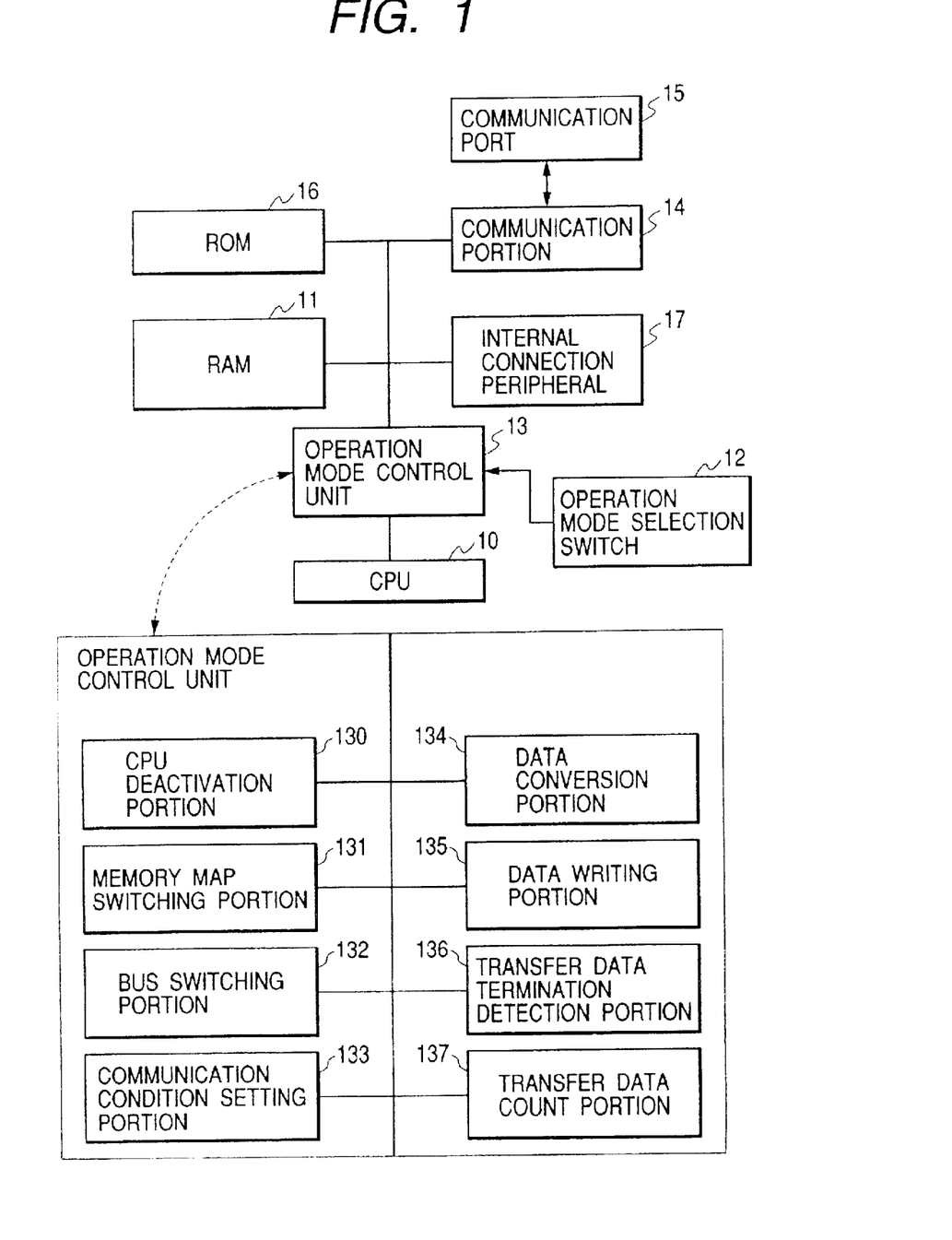
FIG. 1 is a block diagram showing the configuration of a processor system which performs an IPL operation in an embodiment of the present invention.

FIG. 1 shows the basic configuration of a processor system in the first embodiment of the present invention. A CPU 10 shown in FIG. 1 executes a program to control each of portions of the system. This embodiment will be described by assuming that an address which the CPU 10 first reads immediately after startup (after activation from a reset state) is "FFFF0".

A RAM 11 is provided in the processor system, and mapping on the RAM 11 is performed by assigning different addresses with respect to operation modes. This embodiment is described by assuming that only one RAM 11 is provided. However, a plurality of rams may be provided.

An operation mode selection switch 12 determines an operation mode on startup. It is possible to select one of an IPL operation mode and a normal start mode as an operation mode at the time of startup by switching the operation mode selection switch 12. While the operation mode selection switch has been referred to as means for this mode selection, any selecting mechanism may be used for this mode selection as long as it is capable of selecting a particular operation mode from two or more operation modes.

An operation mode control unit 13 operates, on startup, according to the mode selected by the operation mode selection switch 12.

The operation mode control unit 13 has a mechanism which operates in the IPL operation mode, and which is constituted of a CPU deactivation portion 130 for stopping the CPU 10 from operating, a memory map switching portion 131 for changing memory address mapping, a communication condition setting portion 133 for initializing a communication portion 14 (setting communication conditions), a data conversion portion 134 for converting serial data into parallel data, a data writing portion 135 for writing data converted by the data conversion portion 134 to the RAM, and a transfer data termination detection portion 136 for detecting termination of transfer of data from the outside of the processor system. The memory map switching portion 131 also operates in the normal operation mode to perform mapping different from mapping in the IPL operation mode.

Thus, the operation mode control unit 13 has a plurality of functional portions capable of operating according to the operation mode.

Through the communication portion 14, the processor system performs communication with an external. This embodiment is described by assuming that only one communication portion is provided. However, a plurality of communication portions may be connected.

The communication portion 14 may operate based on any of communication systems or devices enabling communication with an external, such as a serial communication system (RS232C), a parallel communication system, USB, SCSI, a network, or a modem, and is not limited to a particular communication system.

This embodiment will be described by assuming that the communication system for the communication portion 14 uses RS232C for easy communication with personal computers. The reason for this selection is because "the communication control method is easy to perform", "the communication control method is simple", and "the communication protocols are fixed".

A communication port 15 is a unit for communication with an external. This embodiment is described by assuming that only one communication port 15 is provided. However, there is no problem even if a plurality of communication ports 15 are connected by being adapted to the communication portion 14.

Since in this embodiment the communication system of the communication portion 14 performs serial communication using RS232C, the embodiment is described by assuming the communication port 15 to be an RS232C serial communication port.

A ROM 16 has fixed information stored therein and is connected to the system. This embodiment is described by assuming that only one ROM 16 is provided. However, there is no problem even if a plurality of different ROMs are connected. Conversely, no ROM 16 may be connected.

A peripheral 17 is a peripheral device formed as a processor system. A plurality of similar peripherals may be connected and, conversely, no peripheral may be connected.

Figure 2:
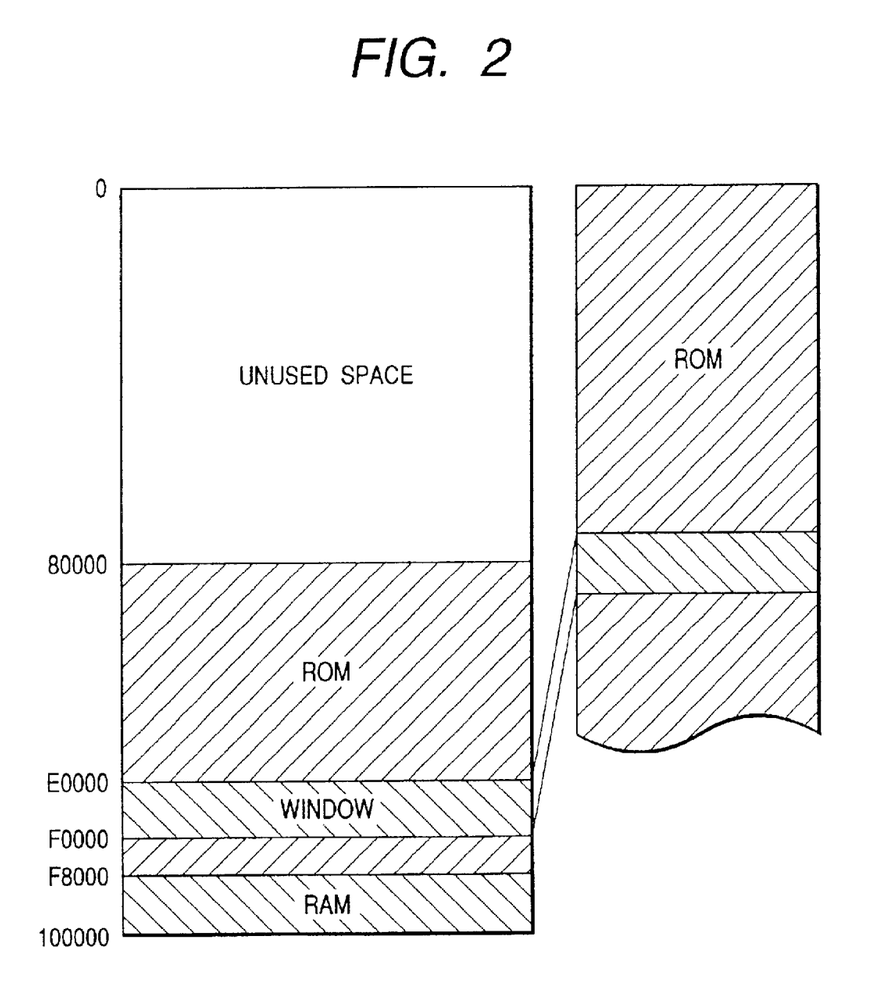
FIG. 2 is a diagram showing an example of address mapping in the IPL operation mode in the embodiment of the invention.

FIG. 2 is a diagram showing an example of address mapping in a case where the operation mode selection switch 12 in the first embodiment selects the IPL operation mode when the operation of the processor system is started.

To an address range "0 to 7FFFF", nothing is mapped. The ROM 16 connected to the processor is mapped to an address range "80000 to F7FFF". A system program for the processor is downloaded to this ROM area. Also, the ROM area includes a portion capable of bank switching by an expanded memory specification (EMS), and the entire area of the ROM can be referred to through an EMS Window.

This address mapping is characterized in that a RAM incorporated in the system is mapped to an address range "F8000" to FFFFF" including the address "FFFF0" that the CPU 10 first reads immediately after startup.

An example of address mapping of the RAM 11 and the ROM 16 connected to the system has been described with reference to FIG. 2. The important point in this example is that a RAM area connected to the system is mapped to the address that the CPU 10 first reads immediately after startup.

That is, whatever the CPU, memory mapping may be freely performed, provided that a RAM area is mapped to the address first read immediately after startup.

Figure 3:
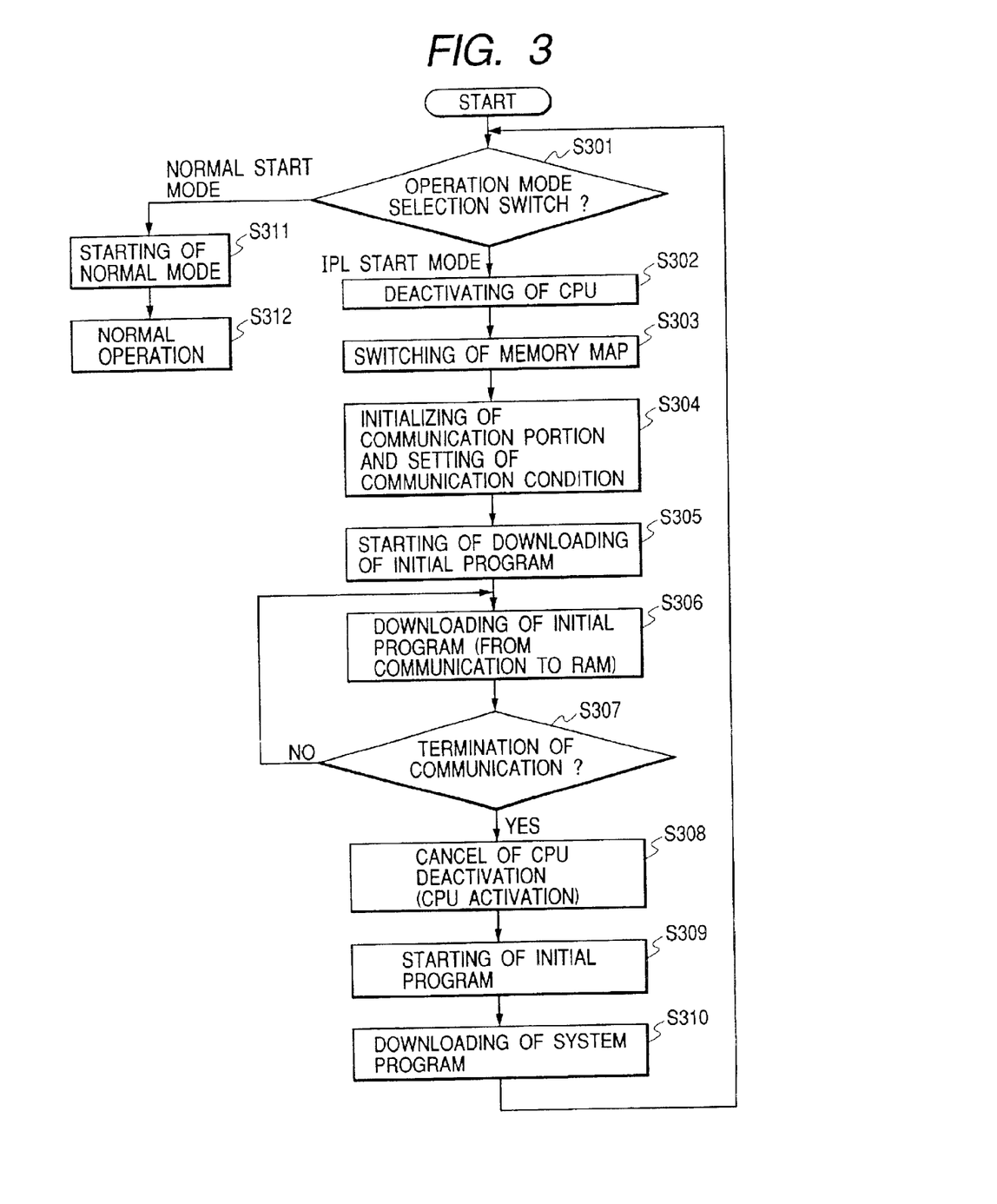
FIG. 3 is a flowchart of the basic operation in the IPL operation mode and in the normal start mode in the embodiment of the invention.

FIG. 3 is a flowchart of the basic operation in the IPL operation mode and in the normal start mode. The operation of the first embodiment will now be described with reference to FIGS. 1, 2, and 3.

If the IPL operation mode is selected by the operation mode selection switch 12, address mapping in the processor system is as shown in FIG. 2.

The operation mode selection switch 12 is operated to select the operation mode (step S301). If the selected mode is the IPL operation mode, the operation mode control unit 13 issues from the CPU deactivation portion 130 a wait signal to stop the operation of the CPU 10. Upon receiving the wait signal, the CPU 10 becomes unable to operate (reset state)(step S302).

When the CPU 10 becomes unable to operate (reset state), the operation mode control unit 13 performs switching by the memory map switching portion 131 to address mapping corresponding to the IPL operation mode, i.e., that shown in FIG. 2 (step S303).

The operation mode control unit 13 then initializes the communication portion 14 (sets communication conditions) by the communication condition setting portion 133 (step S304).

When communication conditions of the communication portion 14 are determined, the operation mode control unit 13 starts downloading of an initial program from the outside of the processor via the communication port 15 (step S305).

After starting downloading of an initial program, the operation mode control unit 13 receives data transmitted by serial communication (RS232C), converts the received data into parallel data by the data conversion portion 134, and writes the converted parallel data to the RAM 11 by the data writing portion 135 (step S306).

In this writing to the RAM 11 in the processor, the address that the CPU 10 first reads after activation from the reset state is set as a start address at which writing of data is started. Since in this embodiment the address the CPU 10 first reads on startup is "FFFF0", downloading is started by setting "FFFF0" as a data writing start address. When writing is advanced to address "FFFFF", downloading addressing jumps to the first address "F8000" of the RAM area, and downloading is again continued.

When a communication termination code indicating the completion of downloading of the initial program is received, the operation mode control unit 13 detects this communication termination code by the transfer data termination detection portion 136, and terminates the operation of downloading the initial program (IPL operation) (step S307).

In this embodiment, the downloadable maximum size of an initial program is automatically set to 32 kBytes at the time of address mapping shown in FIG. 2.

If an initial program having a size larger than 32 kBytes is received, overwriting of previously-received data is caused. Therefore, the operation mode control unit 13 is provided with a transfer data count portion 137, which enables termination of communication when the amount of data corresponding to 32 kBytes is received.

After terminating the IPL operation by detecting the time at which communication is be terminated, the operation mode control unit 13 cancels the CPU deactivation signal (wait signal) from the CPU deactivation portion 130, and the CPU is allowed to operate while the selection of the IPL operation mode (address mapping shown in FIG. 2) is maintained (step S308). In other words, the reset of the CPU is removed in this step for the first time.

The downloaded initial program has been written from the start address corresponding to "FFFF0" on the RAM that the CPU first reads after being started. Therefore, when the CPU deactivation signal is canceled, the CPU starts reading the initial program to initiate the initial program on the RAM (step S309). Subsequently, downloading of a system program is performed based on the initial program (step S310).

(Second Embodiment)

In the description of the first embodiment, the CPU deactivation signal issued from the CPU deactivation portion 130 is referred to as a wait signal. However, a CPU resetting signal or the like may alternatively be used as long as the CPU can be deactivated.

(Third Embodiment)

In the description of the first embodiment, the transfer data termination detection portion 136 is assumed to detect the communication termination code. However, this method for detection by the transfer data termination detection portion is not exclusively used and any other method for detection of termination of communication may alternatively be used. For example, the communication data size may be set in advance, a termination data pattern of communication data may be set in advance, or a signal line for information of termination of communication may be used.

(Fourth Embodiment)

In the first embodiment, address mapping is changed according to the operation mode by the memory map switching portion 131. However, a method of connecting to different memories with respect to the operation modes by using a bus switching portion 132 capable of changing an address bus, a data bus, a signal line or the like may be used instead of the memory map switching method.

(Fifth Embodiment)

In this embodiment, an initial program is downloaded to the RAM 11 connected to the system and is executed by the same method as that described above with respect to the first embodiment. However, a debug program for checking the operation of the peripheral 17 connected to the system shown in FIG. 1 is included in the initial program downloaded to the RAM 11.

The peripheral operation checking debug program included in the initial program is executed after starting of the initial program to check whether the internal peripheral operates normally. This means is a simple but effective in checking the operation of the peripheral.

(Sixth Embodiment)

Also in this embodiment, an initial program is downloaded to the RAM 11 connected to the system and is executed by the same method as that described above with respect to the first embodiment. In this embodiment, a memory check program for checking the ROM 16 connected to the processor system is included in the initial program downloaded to the RAM 11.

The memory check program included in the initial program is executed after starting of the initial program to ascertain whether there is a defect in the ROM 16 connected to the system before downloading of a system program.

The ROM connected to the system has been mentioned as an object of checking. However, each of a plurality of RAMS and ROMs connected to the system may also be set as a checking object.

This method for memory checking achieves easier checking at a higher checking speed in comparison with the generally-practiced method using the Joint Test Action Group (JTAG).

(Seventh Embodiment)

Also in this embodiment, an initial program is downloaded to the RAM 11 connected to the system and is executed by the same method as that described above with respect to the first embodiment. In this embodiment, a program for checking connections to peripherals connected to the processor system is included in the initial program downloaded to the RAM 11.

After starting the initial program, the peripheral connection check program incorporated in the initial program is executed. It is possible to easily detect a defective condition of connections of the peripherals in the processor system by executing the peripheral connection check program.

In the processor system in each of the above-described embodiments, an IPL program is downloaded from the outside of the system, as described above. Therefore, there is no need to provide in the processor system a ROM (including a flash memory) to which an IPL program is written in advance.

Also, since an IPL program is downloaded from the outside of the system, there is no need for provision of a special tool, such as a ROM writer, for changing the IPL program. Further, there is no need for provision of a special circuit for accessing a ROM (including a flash memory) added to the processor system to read out an IPL program. If a general-purpose communication method using RS232C or the like is used for the above-described downloading, a personal computer terminal can be used for downloading.

As described above, it is not necessary for the processor system to have a ROM to which an IPL program is written in advance and a special circuit accompanying the ROM. Consequently, the number of components can be reduced and the component mount area can be reduced. Since an IPL program is executed on a RAM connected to the processor system, rewriting of the IPL program can be easily performed at a high speed.

The method of writing an IPL program from the address first read by the CPU immediately after startup when the IPL operation is performed eliminates the need for always writing transferred data to the entire RAM area in a certain situation, e.g., a situation where a CPU start address exists at a lower position in the memory map. Thus, it is possible to start the CPU by only writing a minimized amount of necessary transferred data.

Since writing to the memory is stopped when a condition is detected which designates a time at which IP program transfer should be terminated, undesirable or unnecessary writing can be inhibited. For example, writing to the memory may be stopped when the amount of data transferred becomes equal to an amount set in advance, thereby inhibiting transfer of an amount of data exceeding the size of the RAM area. Alternatively, writing to the memory may be stopped when a code indicating the end of transfer of a program is detected, thereby inhibiting transfer of an unnecessary amount of data during IPL operation.

Programs (debugging programs) for checking the operation of a connected peripheral, for a memory check, for checking the operation or condition, e.g., the condition of the peripheral connection of a certain device, and the like, are written to the memory together with an IPL program, and are executed when the CPU is activated, thus making it possible to quickly find a defective condition of the system.

If such debug programs are downloaded from the outside of the processor, they can be easily rewritten at a high speed.

Thus, it is possible to check whether the processor system operates normally before downloading of the system program to the processor system (before starting of the system).

The present invention may be applied to a system constituted of a plurality of devices (e.g., a computer main unit, an interface device, a display and the like) or to a unit formed by one device as long as the functions of the above-described embodiments can be achieved.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A system comprising:
   a central processing unit;
   a writable memory;
   means for external communication;
   operation mode selection means for selecting an operation mode; and
   control means for stopping the operation of said central processing unit, mapping to an address area in said writable memory which includes a start address at which said central processing unit is to start reading upon resuming operation, and writing to said memory starting at the start address an IPL program received from an external source through said communication means when an IPL operation mode is selected by said operation mode selection means, and for thereafter resuming operation of said central processing unit such that said central processing unit reads said memory from the start address and initiates the IPL program written to said memory from the external source.

2. A system according to claim 1, wherein said control means includes:
   mapping control means for mapping said writable memory to an area including an address which said central processing unit first reads immediately after startup in the IPL operation mode; and
   write control means for controlling writing of the IPL program such that the writing starts from the address read first.

3. A system according to claim 1, wherein said control means includes:
   detection means for detecting a situation where transfer of the IPL program should be terminated; and
   termination processing means for terminating writing to said memory when a situation where the transfer should be terminated is detected by said detection means.

4. A system according to claim 3, wherein said detection means detects a situation where the transfer should be terminated by ascertaining that a transferred data amount set in advance has been reached.

5. A system according to claim 3, wherein said detection means detects a situation where the transfer should be terminated by detecting from transferred data a code designating termination of transfer.

6. A system according to claim 1, wherein said control means includes bus control means for changing a connection of a bus according to the operation mode, and the bus control means changes the memory as an IPL program writing destination according to the operation mode.

7. A system according to claim 1, wherein said control means performs control such that a check program for checking the operation or condition of a certain device is written to said memory together with the IPL program, and the check program is executed when said central processing unit starts operating.

8. A system according to claim 7, wherein the check program is a program for checking the operation of a peripheral device connected to the system.

9. A system according to claim 7, wherein the check program is a program for checking the state of a memory connected to the system.

10. A system according to claim 7, wherein the check program is a program for checking the state of connection of a peripheral device connected to the system.

11. A method of starting a system having a central processing unit, a writable memory, and a communication unit for external communication, said method comprising the steps of:
    stopping operation of the central processing unit when an IPL operation mode is selected;
    mapping to an address area in the writable memory which includes a start address at which the central processing unit is to start reading upon resuming operation;
    writing to the memory starting at the start address an IPL program received from an external source through said communication unit; and
    resuming operation of the central processing unit after writing the IPL program to the memory, such that the central processing unit reads from the start address and initiates the IPL program written to the memory from the external source.

12. A method according to claim 11, wherein said writable memory is mapped to an area including an address which said central processing unit first reads immediately after startup in the IPL operation mode, and said writing of the IPL program is controlled so as to start from the address read first.

13. A method according to claim 11, wherein a situation where transfer of the IPL program should be terminated is detected, and said writing to said memory is terminated when a situation where the transfer should be terminated is detected.

14. A method according to claim 13, wherein a situation where the transfer should be terminated is detected by ascertaining that a transferred data amount set in advance has been reached.

15. A method according to claim 13, wherein a situation where the transfer should be terminated is detected by detecting from transferred data a code designating termination of transfer.

16. A method according to claim 11, wherein the memory used as an IPL program writing destination is changed according to the operation mode by changing a connection of a bus according to the operation mode.

17. A method according to claim 11, wherein control is performed such that a check program for checking the operation or condition of a certain device is written to said memory together with the IPL program, and the check program is executed when said central processing unit starts operating.

18. A method according to claim 17, wherein the check program is a program for checking the operation of a peripheral device connected to the system.

19. A method according to claim 17, wherein the check program is a program for checking the state of a memory connected to the system.

20. A method according to claim 17, wherein the check program is a program for checking the state of connection of a peripheral device connected to the system.

* * * * *

UNITED STATES PATENT AND TRADEMARK OFFICE
CERTIFICATE OF CORRECTION

PATENT NO. : 6,839,835 B2
DATED : January 4, 2005
INVENTOR(S) : Takahisa Kawade et al.

It is certified that error appears in the above-identified patent and that said Letters Patent is hereby corrected as shown below:

<u>Title page,</u>
*Assistant Examiner*, "Suresh K Suryawanishi" should read -- Suresh K. Suryawanshi --.

<u>Column 1,</u>
Line 64, "writeable" should read -- writable --.

<u>Column 2,</u>
Line 12, "writeable" should read -- writable --.

<u>Column 3,</u>
Lines 36 and 54, "external." should read -- external device. --; and
Line 42, "external," should read -- external device, --

<u>Column 4,</u>
Line 14, "to" should read -- to, -- and
Line 63, "address" should read -- address that --.

Signed and Sealed this

Twenty-fourth Day of May, 2005

JON W. DUDAS
*Director of the United States Patent and Trademark Office*